(12) United States Patent
Fernando et al.

(10) Patent No.: US 11,259,370 B2
(45) Date of Patent: Feb. 22, 2022

(54) MULTI-COMPONENT AEROSOL-GENERATING DEVICE WITH IMPACT ABSORBING PART

(71) Applicant: Altria Client Services LLC, Richmond, VA (US)

(72) Inventors: Keethan Dasnavis Fernando, Neuchatel (CH); Guillaume Frederick, Les-Geneveys-sur-Coffrane (CH); Alasdair David MacBean, Cambridgeshire (GB); Khai Shin Chong, Singapore (SG)

(73) Assignee: Altria Client Services LLC, Richmond, VA (US)

( * ) Notice: Subject to any disclaimer, the term of this patent is extended or adjusted under 35 U.S.C. 154(b) by 505 days.

(21) Appl. No.: 16/214,683

(22) Filed: Dec. 10, 2018

(65) Prior Publication Data

US 2019/0174827 A1    Jun. 13, 2019

Related U.S. Application Data

(63) Continuation of application No. PCT/EP2018/080576, filed on Nov. 8, 2018.

(30) Foreign Application Priority Data

Dec. 8, 2017   (EP) .................................. 172062820

(51) Int. Cl.
*A24F 47/00*   (2020.01)
*H05B 3/44*    (2006.01)
(Continued)

(52) U.S. Cl.
CPC .............. *H05B 3/44* (2013.01); *A24F 40/40* (2020.01); *A24F 40/42* (2020.01); *F16J 15/002* (2013.01);
(Continued)

(58) Field of Classification Search
CPC ................................ A24F 40/40; A24F 40/42
See application file for complete search history.

(56) References Cited

U.S. PATENT DOCUMENTS

| | | | | |
|---|---|---|---|---|
| 2015/0128971 | A1* | 5/2015 | Verleur ..................... | H02J 7/00 131/329 |
| 2016/0128386 | A1* | 5/2016 | Chen ........................ | H05B 3/00 131/329 |
| 2019/0098931 | A1* | 4/2019 | Leadley ................ | A61M 15/06 |

FOREIGN PATENT DOCUMENTS

| | | |
|---|---|---|
| CN | 206294891 U | 7/2017 |
| EP | 2888964 A1 | 7/2015 |
| | (Continued) | |

OTHER PUBLICATIONS

European Search Report (EPO Form 1507N) for European Application No. EP17206282 dated Apr. 16, 2018.

(Continued)

*Primary Examiner* — Eric Yaary
(74) *Attorney, Agent, or Firm* — Harness, Dickey & Pierce, P.L.C.

(57) ABSTRACT

An aerosol-generating system includes a main body, a cartridge, and a connecting component. The main body includes a main body housing enclosing a power supply. The cartridge includes a cartridge housing enclosing a reservoir of liquid aerosol-forming substrate. The cartridge is releasably connectable to the main body by the connecting component. The connecting component is fixed to the main body housing and is less stiff in at least one direction than the main body housing. The connecting component that is less stiff the main body housing and the cartridge housing can act as a shock absorber when the aerosol-generating system experiences a significant impact, such as when dropped on a surface. This reduces damage to other components of the (Continued)

system and, in particular, may prevent leaks of liquid resulting from damage to the liquid reservoir.

16 Claims, 3 Drawing Sheets

(51) Int. Cl.
| | | |
|---|---|---|
| *F16J 15/00* | (2006.01) | |
| *F16J 15/02* | (2006.01) | |
| *H01R 4/48* | (2006.01) | |
| *H01R 13/24* | (2006.01) | |
| *H05B 3/34* | (2006.01) | |
| *F16J 15/10* | (2006.01) | |
| *A24F 40/42* | (2020.01) | |
| *A24F 40/40* | (2020.01) | |
| *A24F 40/10* | (2020.01) | |

(52) U.S. Cl.
CPC ........... *F16J 15/021* (2013.01); *F16J 15/102* (2013.01); *H01R 4/48* (2013.01); *H01R 13/2421* (2013.01); *H05B 3/34* (2013.01); *A24F 40/10* (2020.01); *H05B 2203/021* (2013.01)

(56) References Cited

FOREIGN PATENT DOCUMENTS

| WO | WO-2015/117702 A1 | 8/2015 |
|---|---|---|
| WO | WO-2015/117703 A1 | 8/2015 |
| WO | WO-2015/117704 A1 | 8/2015 |
| WO | WO-2015/117705 A2 | 8/2015 |
| WO | WO-2016054580 A1 | 4/2016 |
| WO | WO-2016/096745 A1 | 6/2016 |
| WO | WO-2016169052 A1 | 10/2016 |
| WO | WO-2017163047 A1 | 9/2017 |
| WO | WO-2017/207320 A1 | 12/2017 |
| WO | WO-2017/207322 A1 | 12/2017 |
| WO | WO-2018/019477 A1 | 2/2018 |
| WO | WO-2018/019485 A1 | 2/2018 |
| WO | WO-2018/019486 A1 | 2/2018 |
| WO | WO-2019/052748 A1 | 3/2019 |

OTHER PUBLICATIONS

International Preliminary Report on Patentability for corresponding Application No. PCT/EP2018/080576, dated Jun. 18, 2020.
International Search Report and Written Opinion for corresponding International Application No. PCT/EP2018/080576 dated Feb. 19, 2019.

* cited by examiner

MULTI-COMPONENT AEROSOL-GENERATING DEVICE WITH IMPACT ABSORBING PART

CROSS-REFERENCE TO RELATED APPLICATIONS

This application is a continuation of, and claims priority to, international application no. PCT/EP2018/080576, filed on Nov. 8, 2018, and further claims priority under 35 U.S.C. § 119 to European Patent Application No. EP17206282.0, filed Dec. 8, 2017, the entire contents of each of which are incorporated herein by reference.

BACKGROUND

Field

Example embodiments relate to handheld aerosol-generating systems. At least one example embodiment relates to modular aerosol-generating systems having at least two connectable parts.

Description of Related Art

A handheld aerosol-generating system may be an electrically heated aerosol-generating system, such as an. An electrically heated aerosol-generating system heats an aerosol-forming substrate to generate an aerosol. In some example embodiments, where the aerosol-forming substrate is a liquid, the liquid is held in a replaceable cartridge that can be attached and removed from a main body of the system. The main body of the system may contain containing the a power source. The heater used to vaporize the liquid is included in the replaceable cartridge. The cartridge is sometimes referred to as a cartomizer, which includes a cartridge and an atomiser.

During vaping, handheld aerosol-generating systems will be dropped. When dropped, the system may experience significant impact forces that can damage the system and may lead to leakage of liquid aerosol-forming substrate.

SUMMARY

At least one example embodiment relates to an aerosol-generating system.

In at least one example embodiment, aerosol-generating system comprises a main body, a cartridge, and a connecting component. The main body includes a main body housing enclosing a power supply. The cartridge includes a cartridge housing enclosing a reservoir configured to contain a liquid aerosol-forming substrate. The connecting component includes an open-ended cavity configured to receive at least a portion of the cartridge. The cartridge is releasably connectable to the main body by the connecting component. The connecting component is fixed to the main body housing and is less stiff in at least one direction than the main body housing and the cartridge housing. The connecting component includes at least one resilient sealing member forming a liquid seal with the main body housing.

In at least one example embodiment, the connecting component includes a projection on a resilient arm. The projection is configured to engage a recess on the cartridge housing to retain the cartridge relative to the main body.

In at least one example embodiment, the portion of the cartridge is configured to be pushed into the open-ended cavity to engage the projection with the recess.

In at least one example embodiment, the connecting component includes a connecting component body formed from a polymer that is less stiff than a material of the main body housing.

In at least one example embodiment, the connecting component is generally cylindrical.

In at least one example embodiment, the at least one resilient sealing member includes an elastomeric sealing rib.

In at least one example embodiment, the elastomeric sealing rib extends around an outer circumference of the connecting component.

In at least one example embodiment, the at least one resilient sealing member includes a pair of sealing ribs extending around an outer circumference of the connecting component.

In at least one example embodiment, the main body and the cartridge extend in a first direction along a common axis. The connecting component includes a sidewall extending in the first direction, and the pair of sealing ribs are spaced apart from one another in the first direction.

In at least one example embodiment, the aerosol-generating system includes an elastomeric sealing rib on a base of the connecting component.

In at least one example embodiment, the connecting component is formed from a resilient material.

In at least one example embodiment, the main body and the cartridge extend in a first direction along a common axis. The connecting component includes a sidewall extending in the first direction. The sidewall includes a plurality of apertures, and the plurality of apertures are separated from each other by partitions extending obliquely to the first direction.

In at least one example embodiment, the partitions are mechanical springs.

In at least one example embodiment, the connecting component is less stiff than the main body housing in a first direction and less stiff than the cartridge housing in the first direction.

In at least one example embodiment, at least one of the cartridge and the main body include spring loaded electrical contacts configured to engage electrical contacts on the other of the main body and the cartridge. At least one spring in the spring loaded electrical contacts is less stiff in a first direction than the connecting component.

In at least one example embodiment, the reservoir of liquid aerosol-forming substrate contains nicotine.

In at least one example embodiment, the connecting component includes at least one airflow channel configured to direct airflow through the aerosol-generating system.

BRIEF DESCRIPTION OF THE DRAWINGS

Example embodiments will now be described, by way of example only, with reference to the accompanying drawings.

DETAILED DESCRIPTION

Figure 1:
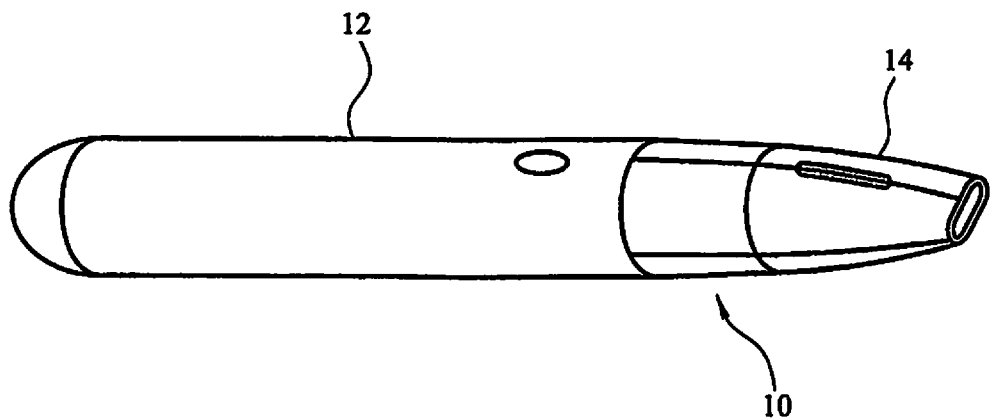
FIG. 1 is a perspective view of an aerosol-generating system in accordance with at least one example embodiment.

Some detailed example embodiments are disclosed herein. However, specific structural and functional details disclosed herein are merely provided for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, etc., but do not preclude the presence or addition of one or more other features, integers, steps, operations, elements, components, etc., and/or groups thereof.

When the words "about" and "substantially" are used in this specification in connection with a numerical value, it is intended that the associated numerical value include a tolerance of ±10% around the stated numerical value, unless otherwise explicitly defined.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations in shapes.

Vapor, aerosol and dispersion are used interchangeably and are meant to cover the matter generated or outputted by the devices disclosed, claimed and/or equivalents thereof.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

At least one example embodiment relates to an aerosol-generating system. The aerosol-generating system comprises a main body. The main body comprises a main body housing enclosing a power supply and a cartridge. The cartridge comprises a cartridge housing enclosing a reservoir of a liquid aerosol-forming substrate and a connecting component. The cartridge is releasably connectable to the main body by the connecting component. The connecting component is fixed to the main body housing and is less stiff in at least one direction than the main body housing and may also be less stiff in at least one direction than the cartridge housing.

A connecting component that is less stiff than the main body housing and the cartridge housing can act as a shock absorber when the aerosol-generating system experiences a significant impact, such as when the aerosol-generating system is dropped on a surface. This reduces damage to other components of the system and, in particular, may reduce and/or substantially prevent leaks of liquid resulting from damage to the liquid reservoir. The connecting component being less stiff provides for a more reliable system in a simple and inexpensive manner.

The connecting component may comprise a projection on a resilient arm. The projection may be configured to engage a recess on the cartridge housing to retain the cartridge relative to the main body. The connecting component may comprise an open ended cavity configured to receive at least a portion of the cartridge. The open ended cavity may be a blind cavity. The open ended cavity may have an open end and a closed end opposite the open end. A portion of the cartridge can be pushed into the cavity to engage the projection with the recess. This allows for simple push-fit connection between the cartridge and the main body. The projection may also be designed to provide for shock absorption. The connecting component may comprise a plurality of spaced projections, each on a resilient arm.

The connecting component may be formed from a polymer that is less stiff than the material of the main body housing and the cartridge housing. Example polymers are Tritan™, Polyphenylene sulphide (PPS), and Polybutylene terephthalate (PBT). The connecting component is formed from a material that has some resilience, allowing it to deform and then recover its shape. The housing of the cartridge and the housing of the main body may be formed from aluminum.

The connecting component may comprise at least one resilient sealing member configured to form a liquid seal with the main body housing. The resilient sealing member may be a circumferential seal extending around an outer circumference of a body of the connecting component, herein referred to as the connecting component body. The resilient sealing member may be a perimeter seal extending around an outer perimeter of the connecting component body. The resilient sealing element may encircle the connecting component body. This provides protection for electronic components in the main body from any liquid that has leaked or condensed within the cartridge. The resilient sealing member may take the form of an elastomeric sealing rib. In at least one example embodiment, the sealing rib extends around an outer circumference of the connecting component body. The sealing rib may extend radially beyond the connecting component body. The sealing rib may extend radially beyond the connecting component body in all directions. This provides for shock absorption against impacts in any direction.

The connecting component may be generally cylindrical. The main body and the cartridge may extend in a first direction along a common axis. The at least one resilient member may comprise a pair of sealing ribs, including an upper sealing rib and a lower sealing rib, which are spaced apart in the first direction. The connecting component may comprise a sidewall extending in the first direction. The one or more resilient ribs may be on an outer surface of the sidewall. The connecting component may comprise at least one aperture in the sidewall to reduce stiffness of the connecting component in the first direction. The aperture may be positioned between the upper and lower sealing ribs.

The connecting component may be less stiff than the main body housing in the first direction and the cartridge housing in the first direction. The at least one resilient sealing member may comprise a base sealing rib formed on a base of the connecting component. The base sealing rib may extend from the connecting component in the first direction.

In an example embodiment, the sidewall comprises a plurality of apertures. The plurality of apertures are separated from each other by partitions. The partitions may extend obliquely to the first direction so as to readily deform under a load in the first direction. The partitions may be mechanical springs, such a leaf springs, and return to their original shape when not loaded. One of the cartridge and main body may comprise spring loaded electrical contacts configured to engage electrical contacts on the other of the main body and the cartridge. Springs in the spring loaded electrical contacts may be less stiff in the first direction than the connecting component. The connecting component may comprise one or more airflow channels configured to direct airflow through the system.

In at least one example embodiment, an aerosol-generating system may comprise a main body. The main body may include a main body housing enclosing a power supply. The aerosol-generating system may further comprise a cartridge. The cartridge may comprise a cartridge housing enclosing a reservoir of liquid aerosol-forming substrate and a connecting component. The cartridge may be releasably connectable to the main body by the connecting component. The connecting component may be fixed to the main body housing. The connecting component may comprise a projection on a resilient arm. The projection may be configured to engage a recess on the cartridge housing to retain the cartridge relative to the main body. The resilient arm may flex as a result of relative movement between the main body and cartridge in a first direction.

The resilient arm may provide a shock absorption when the system is dropped or subjected to high loads in the first direction. The resilient arm may extend in the first direction and the projection may extend from the resilient arm in a direction orthogonal to the first direction. The connecting component may comprise a plurality of spaced projections, each on a resilient arm.

In at least one example embodiment, the cartridge or main body, or both, may comprise an aerosol-generating element. The aerosol-generating element may be a vibrating diaphragm or mesh. In some example embodiments, the aerosol-generating element is a heater. In at least one example embodiment, the heater is located in the cartridge. The heater may be an electrical heater. The electrical heater may operate using the Joule effect by passing a current through a resistive heating element. Alternatively, the heater may be an induction heater, operating by inducing a current in a susceptor element that heats the aerosol-forming substrate.

Liquid may be delivered from the reservoir to the aerosol-generating element. Alternatively, the aerosol-generating element may generate aerosol from liquid within the reservoir. The heater may be fluid permeable to allow liquid or vapor to pass through it. Vapor, aerosol and dispersion are used interchangeably and are meant to cover the matter generated or outputted by the devices disclosed, claimed and/or equivalents thereof. For example, the heater may be a resistively heated mesh. Alternatively, the heater may be a coil of wire wound around or within a capillary wick. The capillary wick may deliver liquid from the liquid reservoir. The heater may be positioned within the cartridge at an end of the cartridge adjacent the connecting component in use.

The aerosol-generating system may be a handheld aerosol-generating system including a mouthpiece having a mouth end opening. The size of the aerosol-generating system may be comparable to a cigar or a cigarette. The aerosol-generating system may have a total length ranging from about 30 mm to about 150 mm. The aerosol-generating system may have an external diameter ranging from about 5 mm to about 30 mm.

In some example embodiments, the main body may comprise control circuitry configured to control a supply of power from the power supply to the aerosol-generating element. The control circuitry may comprise a microcontroller. The microcontroller may be a programmable microcontroller. The control circuitry may comprise further electronic components. The control circuitry may be configured to regulate a supply of power to the aerosol-generating element. Power may be supplied to the aerosol-generating element continuously following activation of the system or may be supplied intermittently, such as on a puff-by-puff basis. The power may be supplied to the aerosol-generating element in the form of pulses of electrical current.

The main body may comprise a power supply arranged to supply power to at least one of the control system and the aerosol-generating element. The aerosol-generating element may comprise an independent power supply. The main body may comprise a first power supply arranged to supply power to the control circuitry and a second power supply configured to supply power to the aerosol-generating element. The power supply may be a DC power supply. The power supply may be a battery. The battery may be a Lithium-based battery. For example the battery may be a Lithium-Cobalt, a Lithium-Iron-Phosphate, a Lithium Titanate, or a Lithium-Polymer battery. The battery may be a Nickel-metal hydride battery or a Nickel cadmium battery. The power supply may be another form of a charge storage device, such as a capacitor. The power supply may be recharged and be configured for many cycles of charging and discharging. The power supply may have a capacity to allow for the continuous generation of aerosol for a period of around six minutes or for a period that is a multiple of six minutes. In another example embodiment, the power supply may have sufficient capacity to allow for a desired (or, alternatively predetermined) number of puffs or discrete activations of the atomiser assembly.

As used herein, an aerosol-forming substrate is a substrate configured to release volatile compounds that can form an aerosol. Volatile compounds may be released by heating the aerosol-forming substrate. Volatile compounds may be released by moving the aerosol-forming substrate through passages of a vibratable element.

The aerosol-forming substrate may be liquid at room temperature. The aerosol-forming substrate may comprise both liquid and solid components. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavor compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of aerosol formers include glycerine and propylene glycol. Aerosol-formers include, but are not limited to: polyhydric alcohols, such as triethylene glycol, 1,3-butanediol, and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts, and natural or artificial flavors.

The liquid aerosol-forming substrate may comprise nicotine and at least one aerosol former. The aerosol former may be glycerine or propylene glycol. The aerosol former may comprise both glycerine and propylene glycol. The liquid aerosol-forming substrate may have a nicotine concentration ranging from about 0.5% to about 10%, for example about 2%.

The cartridge housing may be formed form a moldable plastics material, such as polypropylene (PP) or polyethylene terephthalate (PET). The housing may form a part or all of a wall of the reservoir. The housing and reservoir may be integrally formed. In some example embodiments, the reservoir may be formed separately from the housing and assembled to the housing. The cartridge may comprise a removable mouthpiece through which aerosol may be drawn. The removable mouthpiece may cover the mouth end opening. In some example embodiments, the cartridge may be configured to allow aerosol to be drawn directly from the mouth end opening. The cartridge may be refillable with liquid aerosol-forming substrate. In at least one example embodiment, the cartridge may be designed to be disposed of when the storage compartment becomes empty of liquid aerosol-forming substrate.

Features described in relation to one example embodiment may be applied to the other example embodiments.

At least one example embodiment relates to a handheld aerosol-generating system.

In at least one example embodiment, as shown in FIG. 1, a handheld aerosol-generating system 10 is a two-part system comprising a main body including a main body housing 12 and a cartridge. The cartridge comprises a cartridge housing 14. A connection end of the cartridge housing is removably connected to a corresponding connecting component at the end of the main body housing. The aerosol-generating system 10 is portable and has a size comparable to a cigar or a cigarette.

Figure 2:
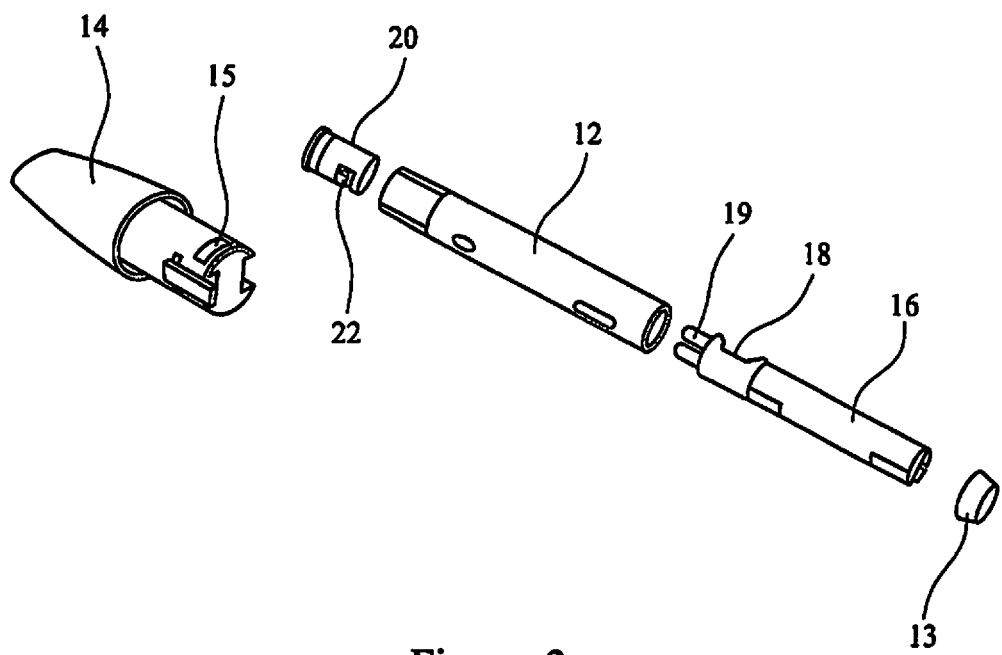
FIG. 2 is an exploded view of an aerosol-generating system in accordance with at least one example embodiment.

FIG. 2 is an exploded view of the aerosol-generating system of FIG. 1. The main body housing 12 contains a battery 16, which, in some example embodiments, is a rechargeable lithium ion battery, and control circuitry 18. Spring loaded electrical contacts 19 are connected to the battery 16 and control circuitry 18 and are configured to engage electrical contacts in the cartridge to deliver electrical power to a heater within the cartridge, as described with reference to FIG. 3A. The main body housing 12 includes an end cap 13. At a connection end of the main body housing 12, a connecting component 20 is received in the main body housing 12. The connecting component 20 includes a pair of latches 22 that engage the cartridge when assembled. The connecting component 20 is described in more detail with reference to FIGS. 4, 5A, 5B, and 6.

The cartridge housing 14 includes a mouthpiece portion and connecting portion that is received in the connecting component 20 of the main body. The connecting portion includes a pair of recesses 15 that engage the latches 22 in the connecting portion of the main body. The cartridge housing 14 encloses a reservoir of liquid aerosol-generating substrate and a heater configured to heat the substrate to generate an aerosol that can be drawn through the mouthpiece.

Figures 3A, 3B:
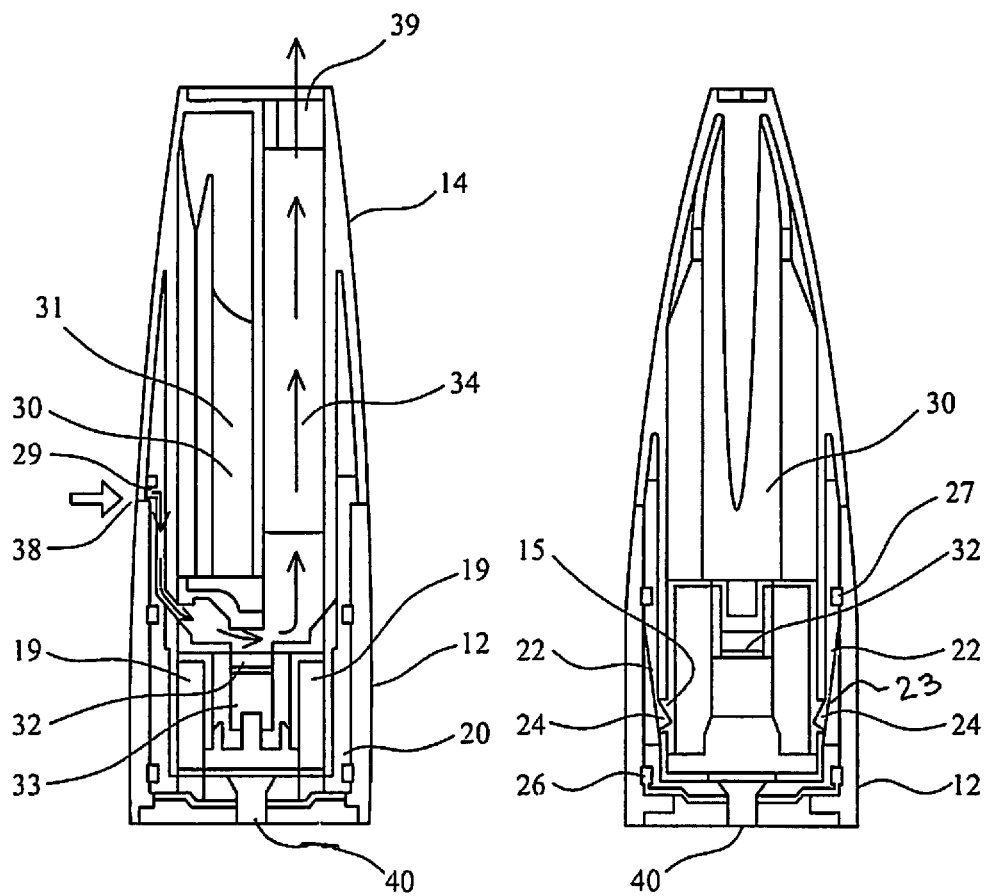
FIG. 3A is a first cross-sectional view through a cartridge end of an aerosol-generating system in accordance with at least one example embodiment.
FIG. 3B is a second cross-sectional view through a cartridge end of an aerosol-generating system in accordance with at least one example embodiment.

FIGS. 3A and 3B are orthogonal cut-away views of the cartridge engaged with the main body, showing the internal components of the cartridge. The cartridge comprises the cartridge housing 14 containing a heater 32 assembly and a liquid storage compartment 30 having a first portion 31 and a second portion 33. A liquid aerosol-forming substrate is held in the liquid storage compartment 30. The first portion 31 of the liquid storage compartment is connected to the second portion 33 of the liquid storage compartment so that liquid in the first portion 31 can pass to the second portion 33. The heater 32 receives liquid from the second portion 33 of the liquid storage compartment 30. The heater 32 is a generally planar, fluid permeable mesh heater. Liquid aerosol-forming substrate delivered to a rear face of the mesh heater is heated and vaporized by the heater 32. The vapor passes through the mesh into an airflow channel 34 that extends from an air inlet 38 passed a front face of the mesh heater to an air outlet 39 at the mouthpiece end of the cartridge.

The components of the cartridge are arranged so that the first portion 31 of the liquid storage compartment 30 is between the heater 32 and the air outlet 39, and the second portion 33 of the liquid storage compartment 30 is positioned on an opposite side of the heater 32 to the air outlet 39.

As shown in FIG. 3B, each of the latches 22 comprises a protrusion 24 on the end of a resilient arm 23. When the cartridge is properly connected to the main body, the protrusions 24 are received in recesses 15 in the cartridge housing 14. There are two latches 22, positioned diametrically opposite one another.

As shown in FIG. 3A, the spring loaded electrical contacts 19 in the main body contact a rear side of the heater 32 to deliver a current through the heater 32 when the cartridge is connected to the main body. FIG. 3A also depicts that the air inlet 38, allowing air into the system, is provided between the cartridge housing 14 and the main body housing 12. The air passes through the air inlet 38 and then through an aperture 29 of the connecting component 20, shown in FIG. 4. The air can then be then drawn between an inner wall of the connecting component 20 and an outer wall of the cartridge housing 14 until it reaches an air passage in the cartridge that extends passed the heater 32 and then to the air outlet 39. The air flow is indicated by arrows in FIG. 3A.

An aperture 28 in the wall of the connecting component 20 allows for fluid communication between the airflow and a pressure sensor in the control circuitry. The aperture 28 allows air to pass between the connecting component 20 and the main body housing 12 from where it can access a pressure sensor held within the main housing. The connecting component 20 is secured to the electronic assembly within the main body housing by a screw 40.

The system is configured so that aerosol may be drawn from the air outlet 39 at the mouth end of the cartridge. In operation, when air is drawn through the mouth end opening, air is drawn through the airflow passage from the air inlet 38, passed the heater 32, to the air outlet 39. The control circuitry 18 controls the supply of electrical power from the battery 16 to the heater 32 when the system is activated. This controls the amount and properties of the vapor produced by the heater 32. The control circuitry 18 may include an airflow sensor, and the control circuitry 18 may supply electrical power to the heater 32 when the airflow sensor detects an airflow. When the airflow is detected, the heater 32 is activated and generates a vapor that is entrained in the airflow passing through the airflow channel 34. The vapor cools within the airflow passage 34 to form an aerosol, which is then drawn through the air outlet 39.

Figure 4:
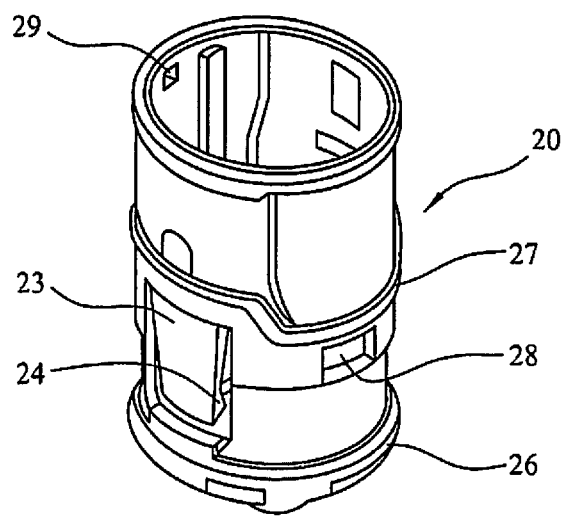
FIG. 4 is a perspective view of the connecting component of FIG. 2 according to at least one example embodiment.
Figures 5A, 5B:
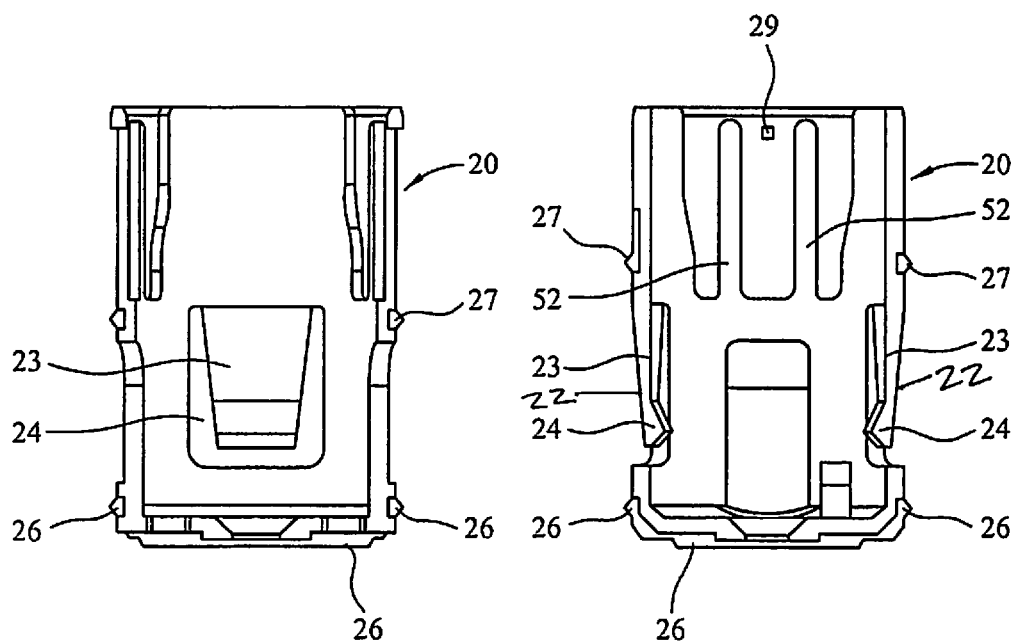
FIGS. 5A and 5B are cross-sectional views of the connecting component of FIG. 4 according to at least one example embodiment.

FIG. 4 is a perspective view of the connecting component 20 in at least one example embodiment. FIGS. 5A and 5B are two different cross sectional views of the connecting component 20. The connecting component 20 has a generally cylindrical body and defines an open ended interior cavity for receiving a portion of the cartridge. The latches 22, comprising inwardly projecting protrusions 24, are clearly visible. The protrusions 24 are positioned on resilient arms 23 extending parallel to a longitudinal axis of the aerosol-generating system. When the cartridge is inserted into the connecting component 20, the cartridge housing pushes against the protrusions 24, causing the resilient arms 23 to flex radially to allow the cartridge housing to pass. When the cartridge is fully inserted into the connecting component, the protrusions 24 align with recesses 15 in the cartridge housing allowing the resilient arms 23 to return to their original position, with the protrusions 24 received in the recesses 15. In this position, the engagement of protrusions 24 with the recesses 15 retains the cartridge in position relative to the main body.

The connecting component 20 also comprises sealing ribs including a lower rib 26 and an upper rib 27. These sealing ribs 26, 27 engage the main body housing and provide a liquid seal. The sealing ribs 26, 27 protect the electronic assembly from any liquid that has leaked from the reservoir or has condensed within the system. The upper rib 27 primarily acts to ensure air enters the cartridge housing through the desired air inlet and not through another path. The lower sealing rib 26 primarily provides a seal to protect the electronics from any liquid.

FIG. 5B shows internal ribs 52 formed on the interior wall of the connecting component 20 on either side of the aperture 29. The internal ribs 52 engage the cartridge housing and ensure that air passing through the aperture 29 is drawn down to the airflow channel within the cartridge. The internal ribs 52 also guide the cartridge to ensure that the cartridge is in the correct orientation relative to the main body housing. The connecting component 20 has an additional function of securing the cartridge to the main body and maintaining an electrical connection between them. The connecting component 20 also provides a shock absorbing function that protects other components of the system from damage.

To be an effective shock absorber, the connecting component 20 is made less stiff than the surrounding components. In particular, the connecting component 20 is less stiff in an axial direction than the main body housing 12 and the cartridge housing 14. The connecting component 20 is made from a relatively compliant, injection moldable polymer. For example, the connecting component may be formed from Tritan™, Polyphenylene sulphide (PPS), or Polybutylene terephthalate (PBT). The material is also resilient enough to allow the connecting component 20 to effectively function to absorb multiple shocks by elastic deformation. In contrast, the main body housing 12 may be relatively stiff, being made from aluminum. The cartridge housing 14, for example, may be made from Tritan.

The spring loaded electrical contacts 19 in the main body comprise springs that may be more compliant than the connecting component 20. This provides some further impact protection to the electronic circuitry to which the spring loaded contacts are connected.

In addition to selecting suitable material or materials for the connecting component 20, the mechanical shape of the connecting component 20 may also enhance its ability to absorb shocks. In at least one example embodiment, the latches 22 provide some impact absorption when the cartridge is moved axially toward the main body, through the elastic deformation of the resilient arms 23, as the protrusions 24 are forced radially outward. The dimensions of the resilient arms 23 and the profile of the protrusions 24 may be chosen to provide greater or lesser shock absorption.

The sealing ribs 26, 27, such as those on the base of the connecting component 20, also provide for shock absorption. The sealing ribs 26, 27 may be formed from a thermoplastic elastomer that is relatively compliant compared to the main body of the connecting component 20. Apertures may also be formed in the sidewall of the connecting component 20 to reduce the stiffness of the connecting component 20 in the axial direction. The aperture 28, for example, reduces the overall stiffness of the connecting component 20 in the axial direction. A larger number of apertures may be provided around the side wall of the connecting component 20 to further reduce stiffness. The apertures may be provided between two axially spaced circumferential sealing ribs to ensure the desired leak protection is attained.

Figure 6:
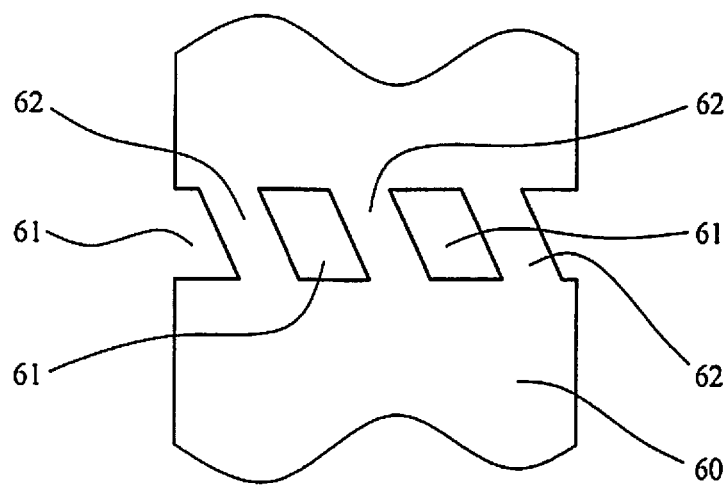
FIG. 6 is a section of a connecting component in accordance with at least one example embodiment.

FIG. 6 illustrates an example embodiment of a section of a connecting component 60 with a plurality of circumferentially spaced apertures 61 separated by partitions 62. The partitions 62 extend oblique to the axial direction and can behave like leaf springs. When the connecting component 60 is subjected to an axial load, the partitions 62 flex axially to absorb the load and return to their original form after the load has been removed. A portion of the wall of the connecting component 60 constructed in this manner provides for excellent shock absorption.

The partitions 62 may be shaped in a different way, for example, to include an elbow in each partition that axially constrains relative movement between the portions of the connecting component 60 on either side of the partitions 62. In some example embodiments, any kind of mechanical spring may be used as a portion of the sidewall of the connecting component 60, such as a helical spring or spring washer having with a radius matching the radius of the connecting component 60 and forming an intermediate portion of the sidewall of the connecting component 60. The provision of a connecting component for connecting a cartridge with a main body of the aerosol-generating device, where the connecting component has a shock absorbing function, provides a more reliable and robust aerosol generating device in a simple and inexpensive manner.

We claim:

1. An aerosol-generating system comprising:
   a main body including,
      a main body housing enclosing a power supply;
      a cartridge including, a cartridge housing enclosing a reservoir of liquid aerosol-forming substrate; and
   a connecting component including,
      a sidewall defining open-ended cavity configured to receive at least a portion of the cartridge, the cartridge being releasably connectable to the main body by the connecting component, and
      at least one resilient member configured to form a liquid seal with the main body housing, the connecting component fixed to the main body housing, the connecting component being less stiff in at least one direction than the main body housing and the cartridge housing;
   wherein the main body and the cartridge extend in a first direction along a common axis, wherein the connecting component includes the sidewall extending in the first direction and a plurality of apertures in the sidewall, and wherein the plurality of apertures are separated from each other by partitions extending obliquely to the first direction.

2. The aerosol-generating system according to claim 1, wherein the connecting component further includes a projection on a resilient arm, the projection configured to engage a recess on the cartridge housing to retain the cartridge relative to the main body.

3. The aerosol-generating system according to claim 2, wherein the portion of the cartridge is configured to be pushed into the open-ended cavity so as to engage the projection with the recess.

4. The aerosol-generating system according to claim 1, wherein the connecting component includes a connecting component body formed from a polymer that is less stiff than a material of the main body housing.

5. The aerosol-generating system according to claim 1, wherein the connecting component is generally cylindrical.

6. The aerosol-generating system according to claim 1, wherein the at least one resilient member includes an elastomeric sealing rib.

7. The aerosol-generating system according to claim 6, wherein the elastomeric sealing rib extends around an outer circumference of the connecting component.

8. The aerosol-generating system according to claim 1, wherein the at least one resilient member includes a pair of sealing ribs extending around an outer circumference of the connecting component.

9. The aerosol-generating system according to claim 8, wherein the main body and the cartridge extend in a first direction along a common axis, wherein the connecting component includes the sidewall extending in the first direction, and wherein the pair of sealing ribs are spaced apart from one another in the first direction.

10. The aerosol-generating system according to claim 1, further comprising an elastomeric sealing rib on a base of the connecting component.

11. The aerosol-generating system according to claim 1, wherein the connecting component is formed from a resilient material.

12. The aerosol-generating system according to claim 1, wherein the partitions are mechanical springs.

13. The aerosol-generating system according to claim 1, wherein the connecting component is less stiff than the main body housing in a first direction and less stiff than the cartridge housing in the first direction.

14. The aerosol-generating system according to claim 1, wherein the cartridge, the main body, or both the cartridge and the main body include spring loaded electrical contacts configured to engage electrical contacts on the other of the main body and the cartridge, and wherein at least one spring in the spring loaded electrical contacts is less stiff in a first direction than the connecting component.

15. The aerosol-generating system according to claim 1, wherein the reservoir of liquid aerosol-forming substrate contains nicotine.

16. The aerosol-generating system according to claim 1, wherein the connecting component includes at least one airflow channel configured to direct airflow through the aerosol-generating system.

* * * * *